May 14, 1968     M. W. FRENCH     3,382,672
GAS TURBINE ENGINE FUEL CONTROL SYSTEM
Filed Nov. 2, 1966
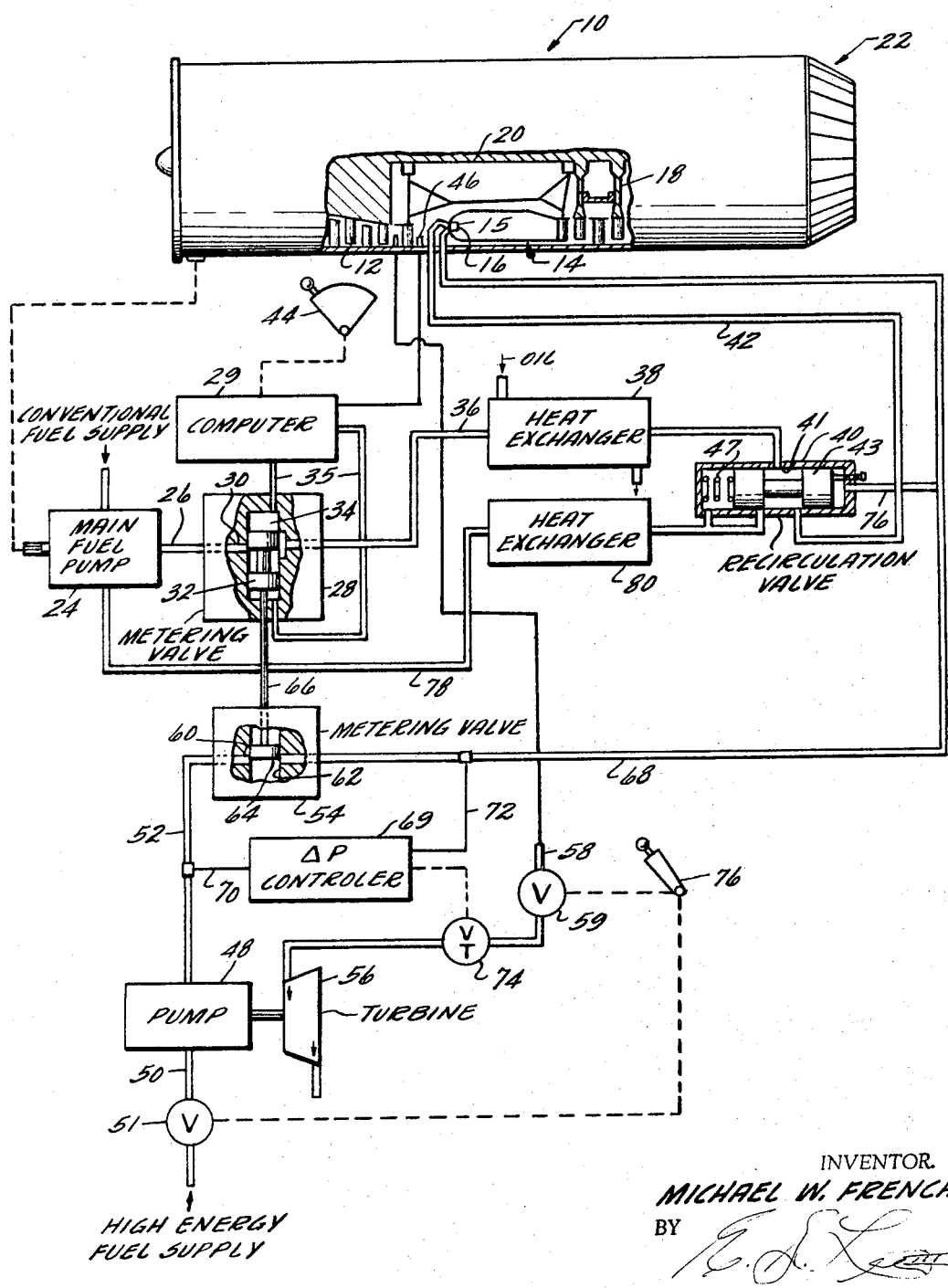
INVENTOR.
MICHAEL W. FRENCH
BY
ATTORNEY 3,382,672
GAS TURBINE ENGINE FUEL CONTROL SYSTEM
Michael W. French, Cincinnati, Ohio, assignor to General Electric Company, a corporation of New York
Filed Nov. 2, 1966, Ser. No. 591,570
9 Claims. (Cl. 60—39.28)

The present invention relates to improvements in fuel control systems and more specifically to fuel control systems used in multifuel gas turbine engines.

In the quest for improved performance and range in aircraft, it has been proposed to use high energy fuel in gas turbine engines. These types of fuels provide a substantially greater available energy of combustion for a given weight when compared to the conventional hydrocarbon fuels now commonly used in gas turbine engines. There are many types of fuels available for this purpose, a typical example being liquid hydrogen. However, the use of high energy fuels as a sole means of powering a gas turbine engine creates certain problems particularly in ground handling and aircraft safety during landing and takeoff.

These problems may be avoided by using a multifuel engine which utilizes conventional hydrocarbon fuel for takeoff and landing and switches to high energy fuels while in flight. Thus, the conventional fuel is available for use in takeoff and landing to insure aircraft safety and ease of handling, while the high energy fuel is available for long range or sustained in-flight cruising.

One of the difficulties resulting from the use of dual fuels is that the fuel control systems required for delivering them to the engine are extremely complex. Much of the complexity results because fuel control systems generally adapted to handle conventional hydrocarbon fuels are incapable of handling many high energy fuels due to their adverse effect on gaskets and sealing components. Thus, a separate fuel control system must be utilized for the high energy fuel.

In addition, the separate fuel control systems must be closely coordinated to provide a smooth transition from the conventional to the high energy fuels. This is necessary because the high energy fuels generally have a much greater energy release per unit mass than do the conventional fuels. If the fuel control systems are not coordinated, a substantial engine power increase may be experienced when switching to the high energy fuel which can cause compressor stall or other operational problems.

Accordingly, it is an object of the present invention to provide a highly effective, simplified and economical fuel control system for a multifuel engine which enables transition from one fuel to another while maintaining substantially or controlled constant power output from the gas turbine engine.

The above ends are achieved by providing a fuel control system for an operator controlled multifuel gas turbine engine having a combustor.

The fuel control system comprises first and second delivery means for providing flow paths for first and second fuels to the combustor. Delivery means includes first and second variable area orifice means for scheduling flow of fuel to the combustor. Means are provided for alternately and selectively controlling the area of the first and second orifice means for scheduling flow of the first and second fuels to the combustor primarily as a function of operator demand. Means are also provided for initiating flow of one of the fuels to said combustor and terminating flow of the other fuels to the combustor. The first and second variable area orifice means have area relationships in response to operator demand so that the energy available from combustion of fuel in the combustor is substantially unaffected when flow of fuel to the combustor is switched from one fuel to the other.

The above and other related objects and features of the present invention will be apparent from a reading of the following description of the disclosure found in the accompanying drawing and the novelty thereof pointed out in the appended claims.

In the drawing:

The figure is a schematic illustration of a multifuel gas turbine engine fuel control system embodying the present invention.

Referring to the drawing, a gas turbine engine 10 comprises a compressor 12 which receives air for pressurization and delivery to a combustor 14. Fuel is injected into the combustor 14 through separate groups of fuel nozzles, generally indicated by reference numbers 15, 16, and the resultant fuel-air mixture is ignited to provide a hot gas stream. The hot gas stream from the combustor 14 is discharged through a turbine 18 which drives the compressor 12 through an interconnecting shaft 20. The hot gas stream is finally discharged from the engine 10 through an exhaust nozzle 22 to provide a propulsive force.

The fuel control system for this engine comprises a first conventional fuel delivery system. An engine driven main fuel pump 24 receives conventional fuel from a suitable source and pressurizes it for delivery through a conduit 26 to a metering valve 28. The metering valve 28 has a passageway 30 provided therethrough for flow of fuel. A valve element 32 is displaceable in a chamber 34 that intersects the passageway 30. The valve element 32 cooperates with the passageway 30 to form a variable orifice, the opening of which is controlled by a computer 29 that displaces the valve element by means of pressure signals transmitted through a pair of conduits 35 to the chamber 34. Suitable pressure control means (not shown) are provided to maintain a constant pressure differential across the metering valve 28 so that the flow of fuel is proportional to the area of the variable orifice.

The fuel from the metering valve 28 passes through a conduit 36 which has a heat exchanger 38 therein to a chamber 41 of a two way valve 40. A valve element 43, displaceable in the chamber 41, is held in the normal illustrated position against a stop 45 by a spring 47. When the valve element 43 is in this position, fuel flows through a conduit 42 to the fuel nozzles 15 for injection into the combustor 14.

The computer 29 generates pressure control signals for displacing the valve element 32 to schedule the conventional fuel to the combustor 14 primarily as a function of the position of an operator controlled lever 44. The computer 29 receives additional control inputs, e.g. compressor discharge pressure from a sensor 46, engine speed and inlet temperature of the turbine 18. The additional control inputs cause the computer to modify the scheduled fuel flow to provide optimum performance of the engine during steady state and transient operation of the engine 10.

The fuel control system has a second fuel delivery means comprising a pump 48 which receives a high energy fuel such as liquid hydrogen from a suitable source through a conduit 50 which has a cut off valve 51 disposed therein. The pump 48 is connected to a turbine 56 which is driven by compressed air from the discharge of the engine compressor 12 through a conduit 58 having a shutoff valve 59 disposed therein. The outlet of the pump 48 is connected to a metering valve 50 via a conduit 52. The metering valve 54 comprises a passageway 60 connected to the conduit 52. A chamber 62 intersects the passageway 60 and has a valve element 64 displaceable therein to form in cooperation with the passageway 60 a variable area orifice. The valve element 64 is displaced by the valve element 32 through an interconnecting rod 66. The outlet of the metering valve 54 is connected by a conduit 68 to the fuel nozzles 16 disposed in the combustor 14.

During operation of the engine 10 on the conventional fuel, the fuel flow is through the first delivery means as previously described. When it is desired to operate the engine on the high energy fuel, fuel flow is initiated through the second delivery means by an operator controlled lever 76 which opens the normally closed shut off valve 78 in the conduit 50 and opens the shut off valve 59 in the conduit 58. Thus, the compressor discharge air passes through the turbine 56 which causes it to drive the pump 48. The pump 48 pressurizes the fuel for delivery to the metering valve 54.

A constant pressure differential is maintained across the metering valve 54 to enable a fuel flow therefrom which is proportional to the opening of the variable area orifice by means of a differential pressure controller 69. The pressure controller 69 is responsive to the upstream and downstream pressures across the metering valve 54, as transmitted thereto through conduits 70 and 72, for controlling the opening of a valve 74 disposed in the conduit 58 to maintain the pressure output of the pump 48 at a predetermined level above the pressure downstream of the metering valve 54.

When flow of the high energy fuel to the combustor 14 is established, the flow of the conventional fuel to the combustor is automatically terminated. For this purpose, a conduit 76 extends from the conduit 68 to one end of the cylinder 41 of the valve 40. As flow of high energy fuel to the nozzle 16 initially increases, the back pressure in the conduit 68 increases. When it reaches a predetermined level, the valve element 41 is translated to the left. This terminates flow of conventional fuel to the fuel nozzles 15 and recirculates the fuel from the conduit 36 through a conduit 78 to a low pressure stage of the fuel pump 24.

When it is desired to switch back to the operation on the conventional fuel, the operator lever 76 is moved to close valves 51, 59 which terminates flow of the high energy fuel to the combustor 14. When this happens, the pressure in conduit 68 is lowered and the valve element 43 is automatically displaced to initiate flow of the conventional fuel to the combustor 14.

The computer 29 continues to receive control inputs while the second fuel is being passed to the combustor 14 and actuates the valve element 64 through the valve element 32. Thus, the computer operates at all times to provide the complex control functions necessary to provide a fuel flow which gives optimum engine performance, thereby eliminating the need for a duplicate computer.

It should be noted that although flow of the high energy fuel and conventional fuel are scheduled by identical control inputs, equal flows of the fuels to the combustor would result in substantially different engine power outputs. This is so because the high energy fuel releases more energy per unit mass upon combustion. Accordingly, the area variations of the two variable orifices are matched so that for all control input conditions, the flow of either fuel to the combustor 14 produces an equal energy release when the fuels are ignited. When transition from one fuel to the other is initiated, there may be some overlap of flows thereby causing an increase of energy release. However, this increase in energy release is so short in time as to not affect the power output from the engine 10 during fuel transition.

As previously mentioned, the fuel from the main fuel control passes through a heat exchanger 38 before passing to the valve 40. This heat exchanger functions to use the conventional fuel as a cooling medium for cooling lubricating oil normally used in a lubrication system to lubricate rotating parts of the engine 10. When the flow of conventional fuel to the combustor 14 is recirculated to the main fuel pump 24, the continual pressurizing and depressurizing of the fuel as it recirculates would cause it to heat up and thus impair its usefulness as a cooling medium for the heat exchanger 38. To prevent the buildup of heat in the conventional fuel during recirculation, a second or auxiliary heat exchanger 80 is provided in the conduit 78 to cool the fuel as it passes to the main fuel pump 24. The cooling medium for this heat exchanger may be conveniently derived from relatively cool air passing around the engine or may be the high energy fuel such as liquid hydrogen.

The present invention is not limited to the use of a multifuel engine which operates on conventional hydrocarbon fuels and liquid hydrogen but may be used in any multifuel engine which operates on diverse types of fuel.

Other modifications of the described embodiment of the present invention may occur to those skilled in the art without departing from the spirit thereof. The scope of the invention is to be determined solely from the following claims.

Having thus described the invention what is claimed as novel and desired to be secured by Letters Patent of the United States is:

1. A fuel control system for an operator controlled multifuel engine having a combustor, said fuel control system comprising:

first and second delivery means for providing flow paths for first and second fuels to said combustor, said delivery means including first and second variable area orifice means for scheduling flow of fuel to said combustor, means for alternately and selectively controlling the area of said first and second variable orifice means for scheduling flow of said first and second fuels to said combustor primarily as a function of operator demand, means for initiating flow of one of said fuels to said combustor and terminating flow of the other of said fuels to said combustor, the variable area orifice means of said first and second delivery means having area relationships in response to operator demand so that the total energy available from combustion of fuel delivered through said first and second variable area orifice means to said combustor is substantially unaffected when flow of fuel to said combustor is switched from one fuel to the other.

2. A fuel control system as in claim 1 wherein;

said first and second variable orifice means comprise:

passageway means disposed in the flow paths of said first and second delivery means, first and second valve elements displaceable in said passageway means to form in combination therewith said first and second variable area orifices, means for mechanically interconnecting said valve elements whereby said valve elements are displaced in unison.

3. A fuel control system as in claim 1 wherein;

said first delivery means further includes pressurizing means disposed upstream of said variable orifice means, said flow terminating means comprises means receiving the output flow from said first variable orifice means for selectively providing a recirculating flow path for said first fuel to a point in the flow path upstream of said pressurizing means when the second fuel is delivered to said combustor.

4. A fuel control system as in claim 3, further comprising;

a first heat exchanger for cooling lubricating fluid, used in said engine, said heat exchanger being disposed between said first variable area orifice and said recirculating means and using said first fuel as a cooling medium, a second heat exchanger disposed between said recirculating means and the point upstream of said pump for cooling said first fuel when said first fuel is recirculated, whereby the temperature rise of said first fuel is minimized when said second fuel is delivered to said combustor.

5. A fuel control system as in claim 1;
wherein said means for controlling the area of said first and second variable area orifices comprise;
means for interconnecting said first and second variable orifices whereby the areas thereof are simultaneously varied,
means for controlling the area of one of said orifices primarily as a function of operator demand.

6. A fuel control system as in claim 5 wherein;
said initiating and terminating means comprise;
means for initiating and terminating flow through one of said delivery means in response to operator demand, and
means for automatically terminating and initiating flow through the other delivery means in response to the respective initiation and termination of flow through the first mentioned delivery means.

7. A fuel control system as in claim 6 wherein;
said automatic flow terminating and initiating means comprises;
valve means disposed in the flow path of one of said delivery means and displaceable between two positions, one of which permits flow to said combustor and the other preventing flow to said combustor,
means for urging said valve means to a position wherein flow is permitted,
conduit means connected to the other of said delivery means for applying the pressure in said other delivery means to said valve means for urging it to a position wherein flow through said first mentioned delivery means is terminated,
whereby the pressure rise in said other delivery means caused by flow therethrough causes said valve means to terminate flow through said first mentioned delivery means.

8. A fuel control system as in claim 7 wherein;
said engine includes a compressor for pressurizing air for delivery to said combustor,
said automatic flow terminating valve means is disposed in the flow path of said first delivery means,
said means for initiating and terminating flow in response to operator demand is disposed in said second delivery means and comprises;
pump means and motor means driven by pressurized air from said compressor,
normally closed valve means for permitting flow of said second fuel through said pump means and flow of compressor air through said motor means in response to operator demand.

9. A fuel control system as in claim 8 wherein said second delivery means further comprises;
valve means for regulating the flow of air from said compressor to said motor means,
means responsive to the pressure differential across said second variable area orifice means for controlling said valve means whereby a constant pressure differential is maintained across said second variable orifice means.

References Cited

UNITED STATES PATENTS

| | | | |
|---|---|---|---|
| 2,632,294 | 3/1953 | Wall | 60—243 |
| 2,909,896 | 10/1959 | Porter | 60—39.28 |
| 2,916,875 | 12/1959 | Morley et al. | 60—39.28 |

JULIUS E. WEST, *Primary Examiner.*